US009800922B2

(12) United States Patent
Kritt et al.

(10) Patent No.: US 9,800,922 B2
(45) Date of Patent: Oct. 24, 2017

(54) INTEGRATING SOCIAL MEDIA WITH RECORDATION OF BROADCAST DATA

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 13/750,253

(22) Filed: Jan. 25, 2013

(65) Prior Publication Data
US 2013/0315560 A1  Nov. 28, 2013

Related U.S. Application Data

(63) Continuation of application No. 13/477,146, filed on May 22, 2012.

(51) Int. Cl.
*H04N 9/80* (2006.01)
*H04N 21/433* (2011.01)
*G06F 17/30* (2006.01)
*H04N 21/25* (2011.01)
*H04N 21/4147* (2011.01)
*H04N 21/472* (2011.01)

(52) U.S. Cl.
CPC ... *H04N 21/4334* (2013.01); *G06F 17/30038* (2013.01); *H04N 21/252* (2013.01); *H04N 21/4147* (2013.01); *H04N 21/47202* (2013.01)

(58) Field of Classification Search
None
See application file for complete search history.

(56) References Cited

U.S. PATENT DOCUMENTS

| 8,498,946 | B1 * | 7/2013 | Parekh et al. | 705/319 |
|---|---|---|---|---|
| 2006/0080725 | A1 | 4/2006 | Paila | |
| 2009/0172127 | A1 | 7/2009 | Srikanth et al. | |
| 2011/0082807 | A1 | 4/2011 | Parekh et al. | |
| 2011/0202515 | A1 | 8/2011 | Stiers | |
| 2011/0251990 | A1 | 10/2011 | Yarvis et al. | |
| 2012/0189273 | A1 * | 7/2012 | Folgner et al. | 386/241 |
| 2013/0014136 | A1 * | 1/2013 | Bhatia et al. | 725/9 |
| 2013/0223816 | A1 * | 8/2013 | Gharaat et al. | 386/249 |

FOREIGN PATENT DOCUMENTS

| CN | 1483279 | 3/2004 |
|---|---|---|
| CN | 101420603 | 4/2009 |

OTHER PUBLICATIONS

"Method and System for Associating Social Networks with Television," IP.com, Dec. 3, 2010.

* cited by examiner

*Primary Examiner* — Heather Jones
(74) *Attorney, Agent, or Firm* — Lieberman & Brandsdorfer, LLC

(57) ABSTRACT

Embodiments of the invention relate to social media and recordation of programs scheduled to be broadcast. Media content on one or more sites are gathered and characteristic data, such as associated tags, are extracted. A correlation of the media content with scheduled television programming is performed to identify any television programs that are related to the extracted content. In response to at least one match, a television program associated with the match is selected for a scheduled recording so that it may be viewed at a later point in time.

13 Claims, 5 Drawing Sheets

INTEGRATING SOCIAL MEDIA WITH RECORDATION OF BROADCAST DATA

CROSS REFERENCE TO RELATED APPLICATION(S)

This application is a continuation patent application claiming the benefit of the filing date of U.S. patent application Ser. No. 13/477,146 filed on May 22, 2012, and titled "Integrating Social Media with Recordation of Broadcast Data", which is hereby incorporated by reference.

BACKGROUND

Technical Field

The present invention relates to a method and system for integration of social media with broadcast data. More specifically, the invention relates to a system and method that combines the tools of a social networking channel with broadcast data to capture and record relevant content scheduled to be broadcast.

Description of the Prior Art

A television (TV) is a telecommunication medium for transmitting and receiving moving images that can be monochrome or colored, with or without accompanying sound. The moving images are generally referred to as television shows. The television has a plurality of channels, each channel set to receive data from different frequency transmissions. It is recognized that each channel may have structured programming detailing shows to be transmitted at select times, with each program having a start time and a finish time.

In recent years, the television market has expanded together with the expansion of broadcast channels. There is a large quantity of channels available, with each channel having a separate schedule of programs. It has become challenging, if not impossible, for a viewer to review an entire list of television programs and schedule time to view the program, or to record the program on a recording device to be viewed at a later time. Similarly, the viewer may have an interest in a program, but not be aware that such a program exists and is scheduled to be transmitted on a television channel. Accordingly, there is a burden associated with selecting, viewing, and/or recording television programs scheduled to be broadcast.

SUMMARY OF THE INVENTION

This invention comprises a method for identifying programs of interest and recording these programs to be viewed at a later point in time.

In one aspect of the invention, a method is provided for application of media content to a television programming apparatus. Media content is gathered, including feedback data associated with the content. One or more tags applied to the feedback data are extracted and correlated with digital content. At least one scheduled broadcast with content matching the correlated digital content is identified. In response to the identification, a recording device is automatically set to capture the identified scheduled broadcast in a digital storage medium.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
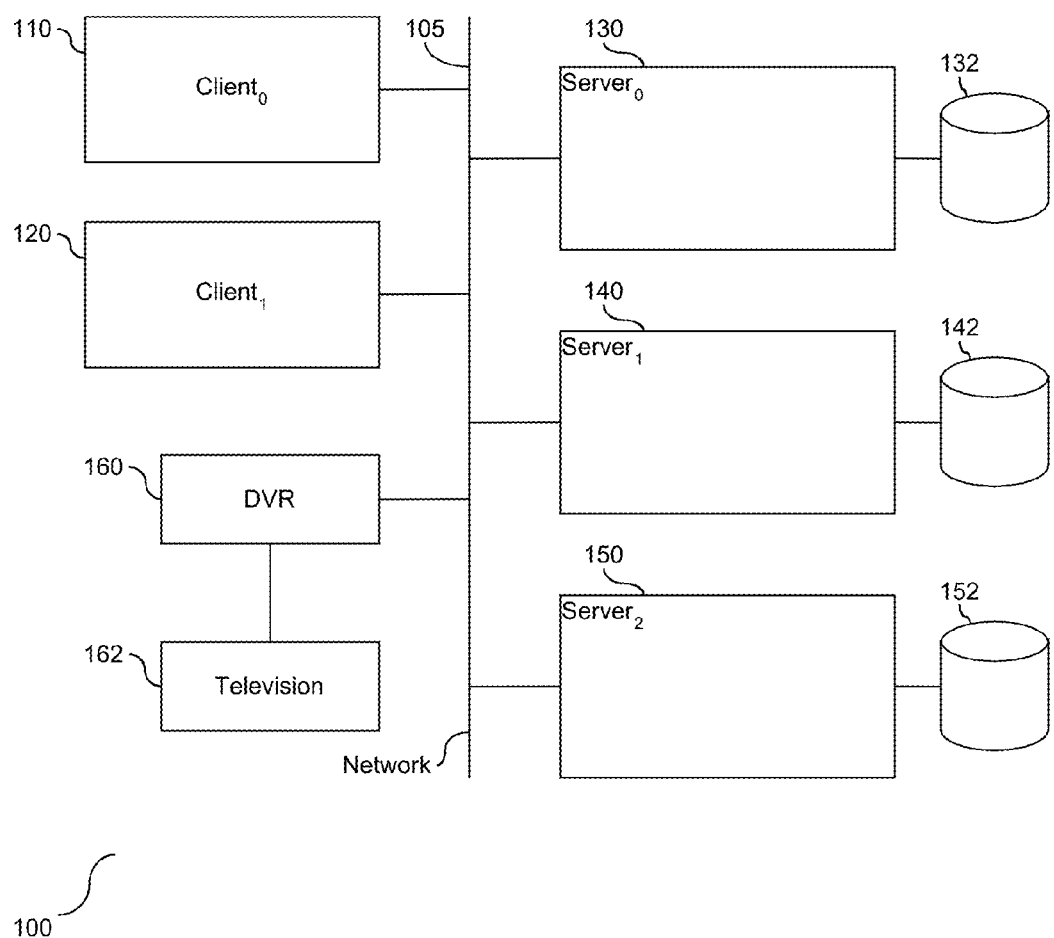
FIG. 1 depicts a schematic view illustrating a communications network.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

FIG. 1 is a schematic view (100) illustrating a communications network. As shown, a plurality of client machines (110), (120) are shown in communication with a plurality of server sites (130), (140), (150) across a network (105). The server sites (130), (140), (150) are shown herein as social networking sites or other data sharing sites. Each of the server sites (130), (140), (150) is shown with local data storage (132), (142), (152), respectively. In one embodiment, server sites (130) and (140) host one or more social networking tools, and server (150) hosts television network programming. A digital video recorder (160) is provided in communication with both the client machines (110), (120) and the server sites (130), (140), (150) across the network (105). The digital video recorder (160) is also in communication with a television (162). Data storage is provided in communication with each of the server sites to store data received from the server sites. As shown, data storage (132) stores data from server site (130), data storage (142) stores data from server site (140), and data storage (152) stores data from server site (150). In one embodiment, data storage (132), (142), and/or (152) may be stored at a remote storage device in communication with the respective server sites (130), (140), and (150). Server site (150) conveys data pertaining to television network programming and associated schedules to television receiving devices, such as the digital video recorder (160) across the network (105). In one embodiment, the digital video recorder (160) may receive information related to television network programming from a satellite connection or a cable connection, and as such, should not be limited to the network connection (105). Each of the social networking sites (130), (140) supports the user sharing information and/or defining personal attributes and preferences for a plurality of people, places, objects, etc. with other members of the social networking sites (130), (140).

The social networking sites (130), (140) are configured as membership sites. Through one of the client machines (110), (120) with access to one or more of the networking sites (130), (140) through the network (105), a user may establish a membership account. Once the account is established, the user may post data to the account, identify areas and objects of interest, including but not limited to people, places, etc. Content associated with a membership in a social networking site (130), (140) is retained in data storage (132), (142), respectively. In one embodiment, the content is stored in remote data storage in communication with the social networking site (130), (140) across the network connection (105). At the same time, in establishing or maintaining the membership in the social networking site (130), (140), the user may provide authorization for their content to be shared with a select set of other membership accounts. Accordingly, the social network site (130), (140) provides a venue for sharing among select membership accounts through the network connection (105).

Figure 2:
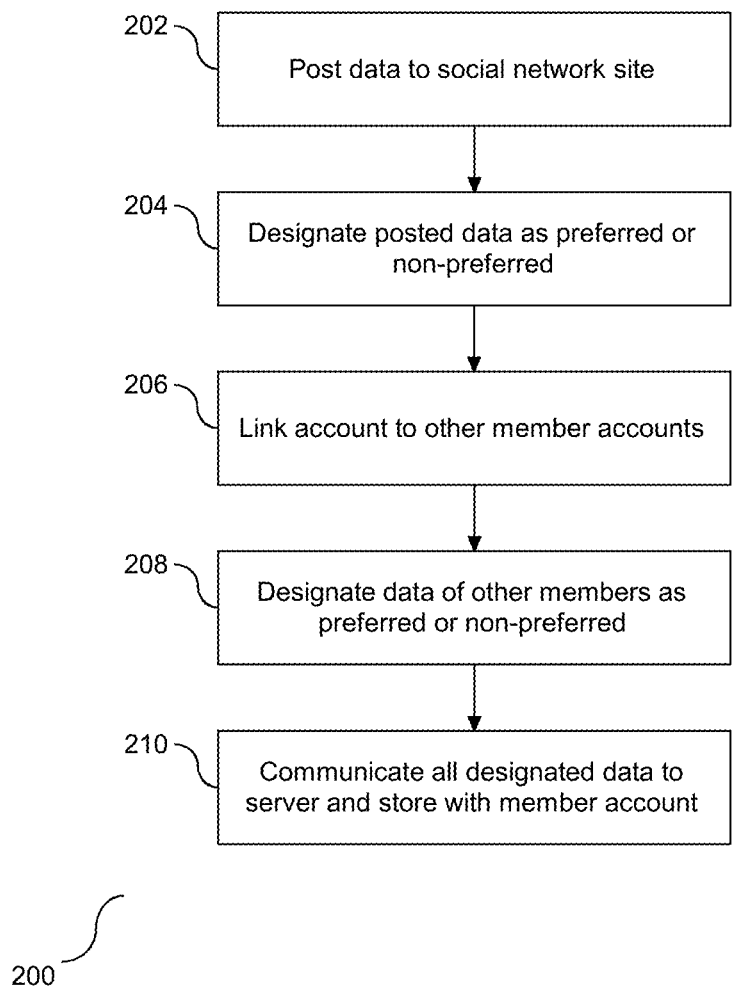
FIG. 2 depicts a flow chart illustrating a process for analyzing user preferences associated with a membership account.

FIG. 2 is a flow chart (200) illustrating a process for analyzing user preferences associated with a membership account. As described above, each member of a social network site may post data to the account, including but not limited to text, images, video, etc. (202). For each data posted to their account, the member of the account may designate one or more of the data items as a preferred element or a non-preferred element (204), e.g. like or dislike. In one embodiment, the designation may be in the form of data items that the member likes or dislikes. The designation may be referred to as tagged data, feedback data, etc., and such terms may be used interchangeably to characterize the select social networking associated data. Additionally, the member account may be linked to other member accounts based upon a mutual agreement and/or authorization (206).

For each data posted on a linked member account, the member may also designate one or more of the posted data items of the other members as a preferred element or a non-preferred element (208). All data items designated as a preferred element or a non-preferred element is communicated to the server and stored in associated data storage against the member account (210). Specifically, the information associated with the preferred element or non-preferred element is extracted and stored. The extracted information includes, but is not limited to, image objects, combinations of different image objects, images objects from a different video frame of a video and text data, including keywords and phrase, etc. Accordingly, designated data from the member account and other member accounts related to the member are stored and referenced to the member.

Figure 3:
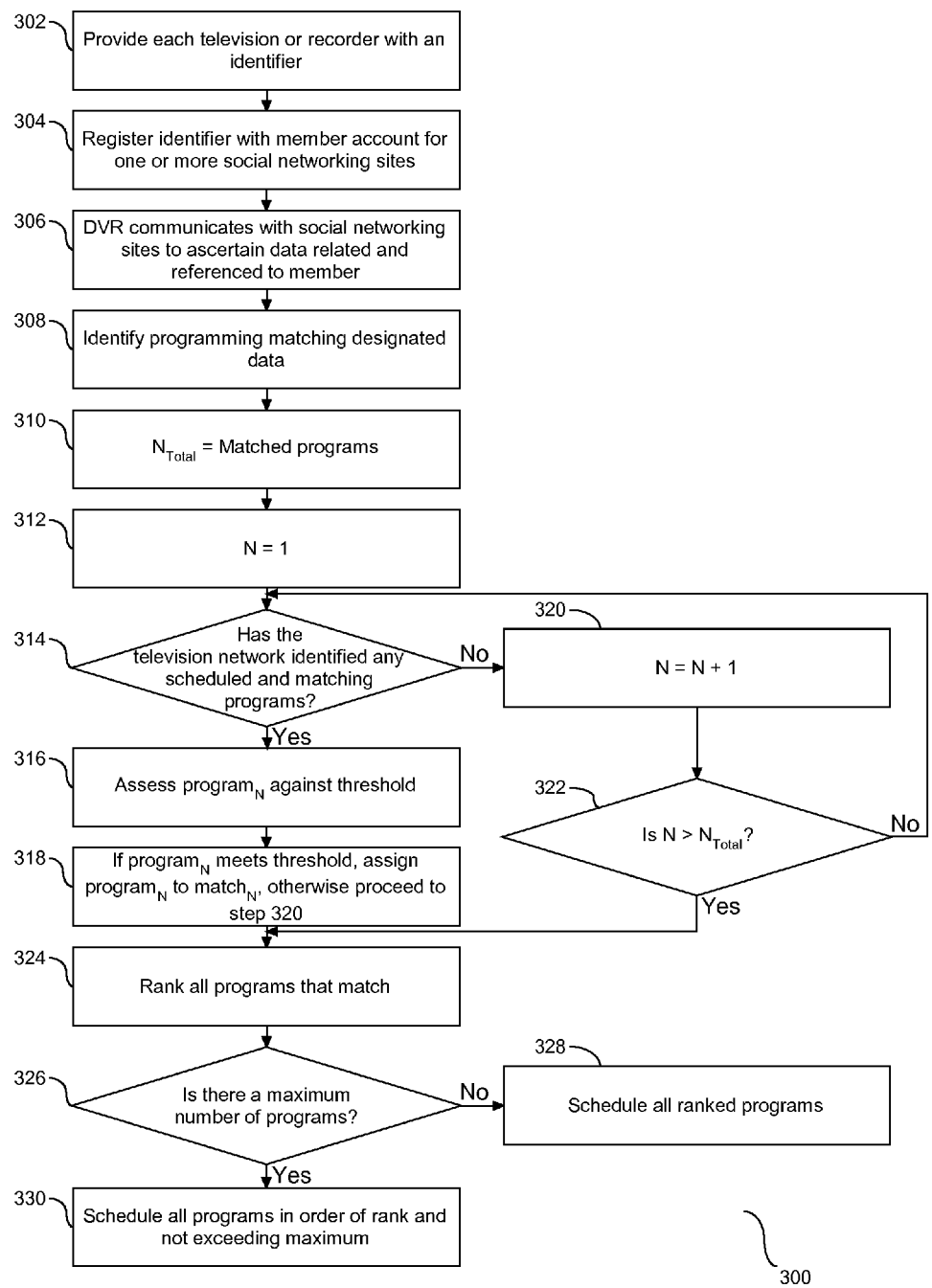
FIG. 3 depicts a flow chart integrating the television network with the client machines and the server sites, and specifically the television and/or digital video recorder in communication with the client machine(s).

The designated data from the member accounts is employed and associated with transmission of television programming. As shown in FIG. 1, television network programming is provided in communication with both the client machines (110), (120), the digital video recorder (160) and the server sites (130), (140) from server site (150). FIG. 3 is a flow chart (300) integrating the television network with the client machines and the server sites, and specifically the television and/or digital video recorder in communication with the network (105). Each television (162) and/or digital video recorder (160) is provided with a unique identifier (302), which is registered with a member's social networking account (304). The television and/or digital video recorder communicates with one or more social networking sites to ascertain data related to the member that are stored and referenced to the member (306). Specifically, the television network (160) performs a query to identify all scheduled programming matching the designated data (308). In one embodiment, the query at step (308) includes performing a query against video metadata associated with the television network programming. The video metadata may include objects associated with video and/or audio content, which may be a part of the video or reside external to the video.

All television programs that match the designated data are assigned to the variable $N_{Total}$ (310), and a counting variable, N, is set to the integer one (312). Is it then determined if the television network has identified any scheduled programming that matches the designated data N (314). A positive response to the determination at step (314) is followed by an assessment of the identified scheduled programming against a defined threshold. More specifically, the member of the social networking account may set a defined value for a time duration in which the matching designated data is present in the identified scheduled programming (316). In one embodiment, the time duration may be a minimum time duration or a maximum time duration. Similarly, in one embodiment the time duration for the threshold may be a sequential value or an aggregate value. Each scheduled programming that meets the defined threshold is assigned to the variable $Match_N$ (318). Following a positive response to the determination at step (314) or the assignment at step (318), counting variable N is incremented (320), and it is determined if there are any potential matching television shows to be assessed (322). A negative response to the determination at step (322) is followed by a return to step (314). Conversely, a positive response to the determination at step (322) is followed by conclusion of the matching process. Accordingly, each television program that is determined to match the designated data is assessed against a threshold value.

Keywords that are identified in the social networking data may be common nouns, proper nouns, names of specific individual, names of places, etc. Similarly, in one embodiment, the keywords may be in the form of type or genre. Without employment of a threshold or definition of the threshold, the quantity of relevant scheduled television programs may be too large to organize. As such, the threshold definition provides a filter in an effort to return the most relevant television programs to the member. As demonstrated, each of the assessment programs that meet or exceed the defined threshold is counted. Following step (322), these assessed programs are ranked (324). In one embodiment, there are various programming tools and algorithms for sorting data which may be employed to rank the assessed programs. The member may have a second threshold value associated with the ranked programs. More specifically, it is determined if there is a maximum quantity of ranked programs that may be employed for the scheduled programming (326). A negative response to the determination at step (326) is followed by a communication with the television or digital video recorder to schedule each of the assessed programs that have met the threshold in the order of the ranking (328). If however, there is a maximum quantity defined, only those programs that meet the ranking definition are communicated to the television or digital video recorder (330). Accordingly, the ranking together with the ranking threshold supports a refinement of the television programs designated for recording.

As demonstrated, programs are scheduled based upon a ranking of feedback data associated with digital media content. In one embodiment, a feedback control system is employed to redefine the ranking of the extracted tags. For example, a member may have select program that they are not interested in viewing, regardless of the ranking, and the feedback control system may solicit this information and redefine the ranking based on the feedback. Similarly, the member may have some feedback data that they want assessed and ranked. The member can convey this preference and have it incorporated into the feedback control system. Accordingly, the ranking may be expanded to incorporate select preferences or select non-preferences.

Figure 4:
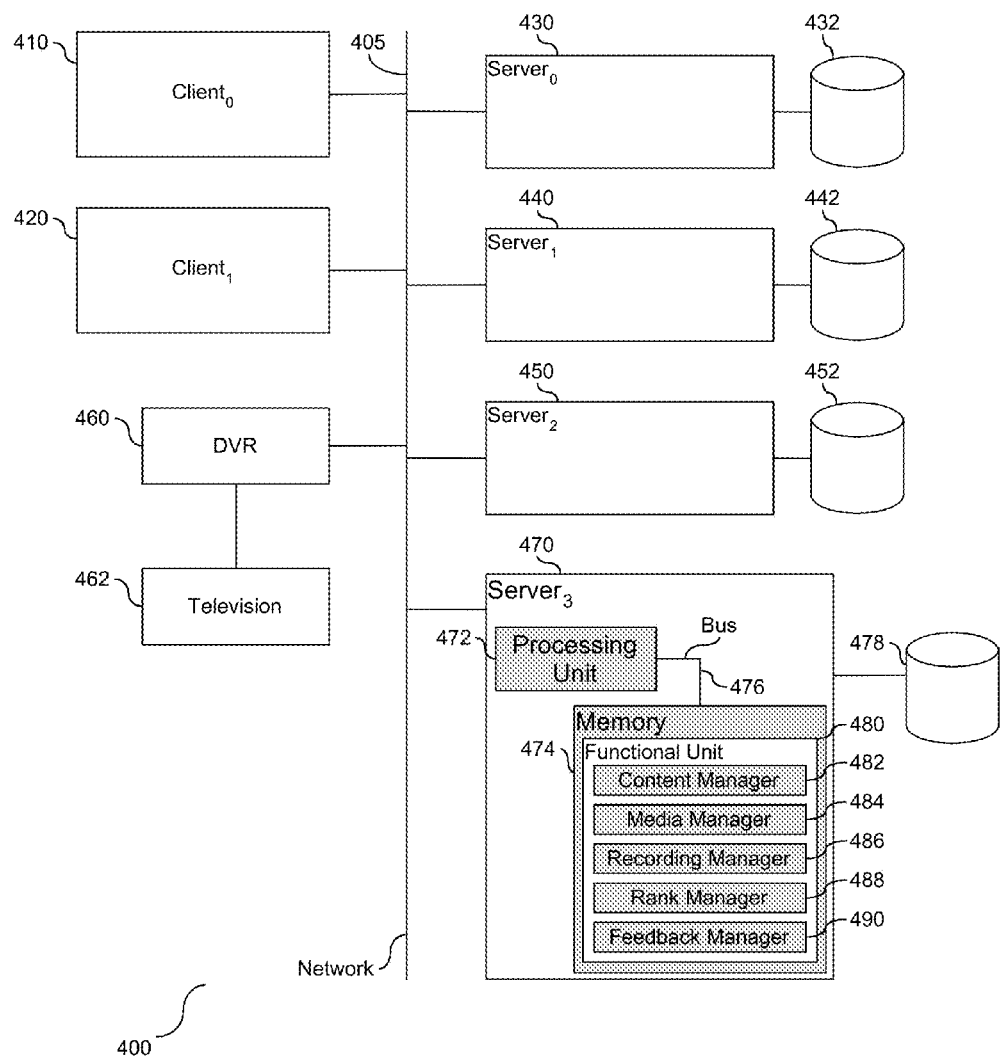
FIG. 4 depicts a block diagram illustrating tools embedded in a computer system to support application of social media content to television programming.

As described above, social networking data is extrapolated and applied to scheduling television programs to be recorded and viewed at a later point in time. The extrapolation includes identification of programming of interest together with a threshold and ranking system to refine the programmed and address programs that may be more relevant. FIG. 4 is a block diagram (400) illustrating tools embedded in a computer system to support application of social media content to television programming. For illustrative purposes, a computer system is provided with two client machines (410), (420) and a digital recording device (460) in communication with server sites (430), (440), (450), and (460) across a network (405). In one embodiment, the server sites (430), (440), and (450), shown herein host one or more social networking sites, television network programming, or other shared data sites. Server (470) is provided in communication with the server sites (430), (440), and (450), client machines (410) and (420), and digital video recorder (460) across the network (405). The server (470) is provided with a processing unit (472) in communication with memory (474) across a bus (476), and local data storage (478). In one embodiment, the server (470) is in communication with remote data storage devices or remote data centers (not shown) through the network (405).

A functional unit (480) is provided in communication with memory (474); the functional unit (480) supports management of identification and scheduling of program recordation. As shown, the functional unit (480) is provided with a content manager (482), a media manager (484), a recording manager (486), a rank manager (488), and a feedback manager (490). The content manager (482) functions to gather media content. As shown, the content may be present on different server sites (430), (440), and the content manager (482) functions to gather the media content from the server sites (430), (440). In one embodiment, the content pertains to social networking and associated social media data. The content manager (482) gathers the media content, including feedback data associated with the media content. Feedback data may include, but is not limited to, data associated with the media content, such as opinion data from members and sites linked to the subject site. In one embodiment, the feedback data includes tags associated with the content, such as proper nouns identifying the subject of the data. The content manager (482) extracts the tags applied to the feedback data. Accordingly, the function of the content manager is to gather and organize media content, including but not limited to media data, affiliated feedback data, and any tags applied to the media data.

The media manager (484) is provided in communication with the content manager (482). Specifically, the media manager (484) correlates the tags that have been extracted with the content and identifies one or more programs scheduled to be broadcast with content that matches the correlated digital content. In one embodiment, the feedback data provides insight into positive or negative feelings about the content. The content associated with the feedback is correlated to the scheduled programs to ensure that the subject matters match. The recording manager (486), which is in communication with the media manager (484), functions to set a recording device to capture one or more identified program broadcasts that match the relevant content identified by the media manager (484). Specifically, the recording manager (486) stores the scheduled program in a data storage medium to be concurrently viewed or viewed at a later point in time.

The rank manager (488) is provided in communication with the media manager (484). The rank manager (488) ranks the extracted tags. In one embodiment, the ranking is based on an assessed cumulative score for each identified and matching scheduled broadcast. The assessed cumulative score includes feedback in the form of positive feedback and/or negative feedback. Feedback data in the form of tags is based upon subjective data, which is subject to change. To accommodate changes pertaining to the feedback data, a feedback manager (490) is provided in communication with the rank manager (488) to redefine the ranking of the extracted tags. Accordingly, the ranking of the extracted tags is dynamic and subject to change.

Tags associated with media content may be applied by the member of the content account. Similarly, tags may also be applied by a non-member of the content account. The member of each account may provide permission to other members to view data on the account. Those members with permission may view content, and in some embodiments may have authorization to apply tags to the viewed data. For example, the non-member may identify a person, place, or object in an image in an associated tag. Similarly, the non-member may apply their subjective opinion to the person, place, or object to the content, e.g. like or dislike of the content. Accordingly, tags and associated data may be applied to the media content by a member of the site or a non-member of the site with permissible access to the site.

The tags and associated content are compared to one or more programs of a scheduled television broadcast. Specifically, the recording manager (486) may check the identified broadcast schedule against a threshold limit for the duration of the correlated digital content. For example, an identified object may relate to three scheduled programs, each scheduled program having a different length of time pertaining to the identified object. In one embodiment, the threshold limit is a defined minimum length of time in which the identified object must be present in the scheduled program in order for the program to be identified and selected for recording. The recording manager (486) functions to communicate with the recording device to limit the scheduled broadcasts for recordation to those broadcasts that meet the applied threshold. The duration may be for sequential or aggregate presence of the subject content. Accordingly, the recording manager (486) functions as a tool to parse the scheduled recordings and to identify those scheduled recordings that are likely to be of interest to the member.

As identified above, the content manager (472), media manager (474), recording manager (476), rank manager (478), and feedback manager (480), hereinafter referred to as tools, function as elements to support the organization of digital content and application of the organized content to a recording device. The tools (472)-(480) are shown residing in memory (434) local to the server (434). However, the tools (472)-(480) may reside as hardware tools external to memory (434), or they may be implemented as a combination of hardware and software. Similarly, in one embodiment, the tools (472)-(480) may be combined into a single functional item that incorporates the functionality of the separate items. As shown herein, each of the tools (472)-(480) are shown local to the server (430). However, in one embodiment they may be collectively or individually distributed across a network or multiple machines and function as a unit to evaluate hardware performance. Accordingly, the tools may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
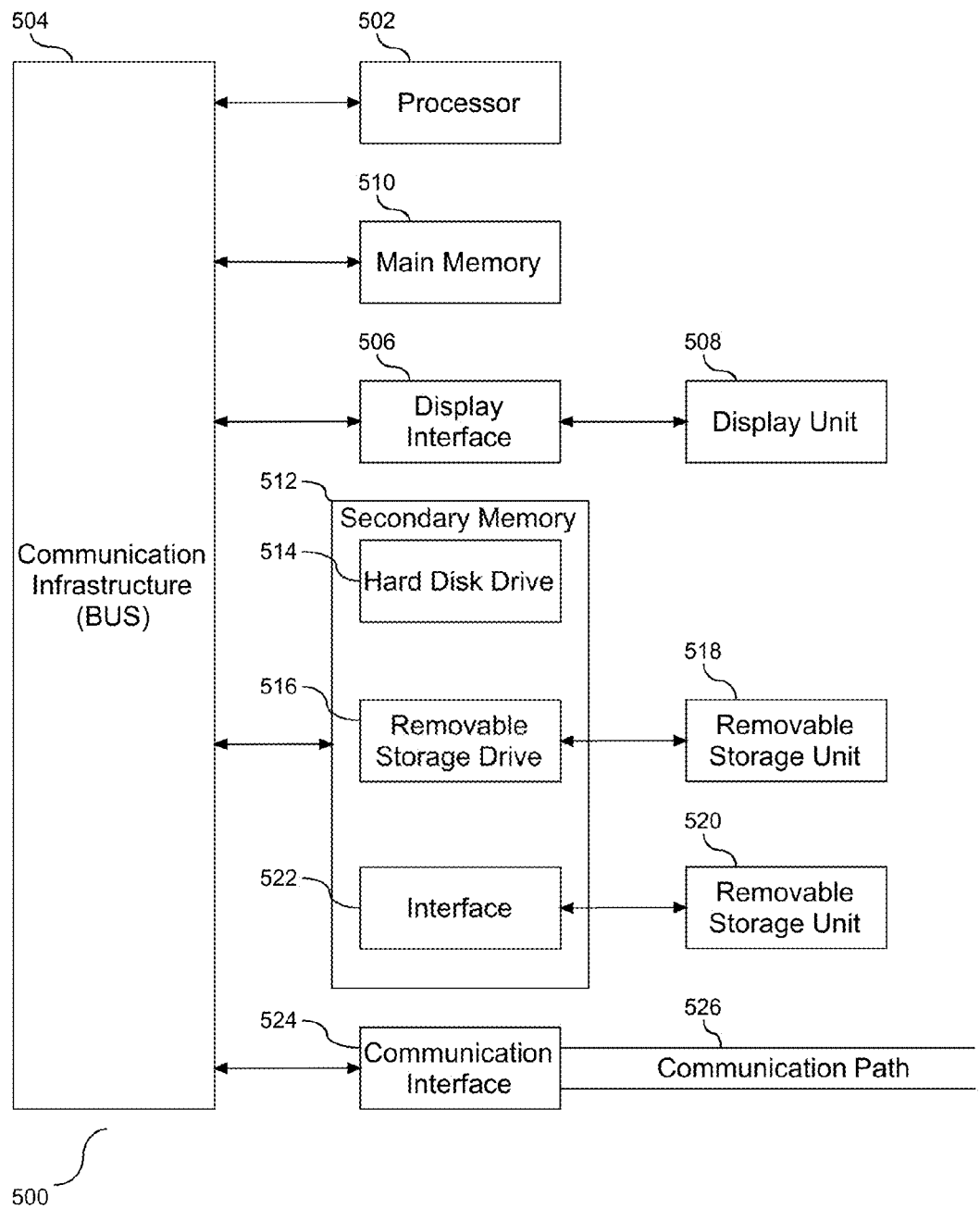
FIG. 5 depicts a block diagram showing a system for implementing an embodiment of the present invention.

Referring now to the block diagram (500) of FIG. 5, additional details are now described with respect to implementing an embodiment of the present invention. The computer system includes one or more processors, such as a processor (502). The processor (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516). As will be appreciated, the removable storage unit (518) includes a computer readable medium having stored therein computer software and/or data.

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) are in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present invention as discussed herein. In particular, the computer programs, when run, enable the processor (502) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
    gathering media content, including feedback data associated with the content, wherein the feedback data is received from one or more social networking accounts;
    extracting one or more tags applied to the feedback data;
    correlating the extracted tags with digital content;
    comparing the correlated digital content to one or more scheduled broadcasts including, identifying at least one scheduled broadcast with digital media content matching the correlated digital content;
    measuring a time duration that the content matching the correlated digital content is present in the identified scheduled broadcast, the time duration is a time value associated with the content matching the correlated digital content;
    comparing the measured time duration to a defined value;
    registering a recording device identifier with at least one of the accounts;
    matching the identified scheduled broadcast with at least one device identifier based on the feedback data and the comparison; and
    automatically setting a recording device associated with the matching identifier, the device to capture the at least one identified scheduled broadcast in a data storage medium.

2. The method of claim 1, further comprising dynamically ranking the extracted tags based on an assessed cumulative score for each identified and matching scheduled broadcast, wherein the assessed cumulative score includes positive and negative feedback, wherein the extracted tags are subject to change.

3. The method of claim 2, further comprising a feedback control system for redefining ranking of the extracted tags.

4. The method of claim 1, wherein the extracted tags are applied to the media content by a third party.

5. The method of claim 1, further comprising checking the identified scheduled broadcast against the defined value, wherein the defined value is a threshold limit for the time duration of the content matching the correlated digital content, and limiting setting of the recording device to one or more scheduled broadcasts meeting the applied threshold.

6. The method of claim 5, wherein the time duration is selected from the group consisting of: sequential and aggregate.

7. The method of claim 5, wherein the defined value is selected from the group consisting of: a minimum length of time and a maximum length of time.

8. The method of claim 1, wherein the extracted one or more tags include proper nouns identifying the subject of the data.

9. The method of claim 1, wherein the time duration is a length of time of the content matching the correlated digital content.

10. The method of claim 1, wherein comparing the correlated digital content to one or more scheduled broadcasts further comprises:
    comparing the correlated digital content to metadata associated with the one or more scheduled broadcasts; and
    wherein identifying the at least one scheduled broadcast is based on the comparison of the correlated digital content to the metadata.

11. The method of claim 1, wherein the identified at least one scheduled broadcast has a first subject matter that matches a second subject matter of the correlated digital content.

12. The method of claim 1, wherein the content matching the correlated digital content is a portion of the identified at least one scheduled broadcast.

13. The method of claim 1, wherein the digital media content is selected from the group consisting of: video, audio, and combinations thereof.

* * * * *